United States Patent
Rajasekar et al.

(10) Patent No.: US 11,556,506 B2
(45) Date of Patent: Jan. 17, 2023

(54) CONSISTENT SCHEMA-LESS SCALABLE STORAGE SYSTEM FOR ORDERS

(71) Applicant: eBay Inc., San Jose, CA (US)

(72) Inventors: Anand Sekar Rengasamy Rajasekar, Cupertino, CA (US); Srilatha Koneru, Los Altos, CA (US); Mansi Narula, Fremont, CA (US); Senthilnathan Subramanian, San Jose, CA (US); Vijayshree Singh, San Jose, CA (US); Scott Sharp, Sunnyvale, CA (US); Vijay Kumar Sivakumar, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 73 days.

(21) Appl. No.: 17/148,332

(22) Filed: Jan. 13, 2021

(65) Prior Publication Data
US 2021/0141772 A1 May 13, 2021

Related U.S. Application Data

(63) Continuation of application No. 14/947,998, filed on Nov. 20, 2015, now Pat. No. 10,909,089.

(51) Int. Cl.
*G06F 16/21* (2019.01)
(52) U.S. Cl.
CPC ................ *G06F 16/211* (2019.01)
(58) Field of Classification Search
CPC .................................... G06F 16/211
USPC ........................................ 707/792
See application file for complete search history.

(56) References Cited

U.S. PATENT DOCUMENTS

| | | | |
|---|---|---|---|
| 6,754,670 B1 | 6/2004 | Lindsay et al. | |
| 7,350,191 B1 * | 3/2008 | Kompella | G06F 8/61 707/999.005 |
| 7,418,435 B1 | 8/2008 | Sedlar | |
| 8,688,666 B1 | 4/2014 | Briggs et al. | |
| 10,909,089 B2 | 2/2021 | Rajasekar et al. | |
| 2002/0156767 A1 | 10/2002 | Costa et al. | |
| 2005/0149907 A1 | 7/2005 | Seitz et al. | |
| 2008/0016122 A1 | 1/2008 | Liu et al. | |

(Continued)

OTHER PUBLICATIONS

Final Office Action received for U.S. Appl. No. 14/947,998, dated Oct. 3, 2019, 8 pages.

(Continued)

*Primary Examiner* — Kimberly L Wilson
(74) *Attorney, Agent, or Firm* — Holland & Hart LLP

(57) ABSTRACT

In various example embodiments, a system and method for consistent schema-less and scalable database storage are described herein. A data object is generated. The data object corresponds to a column of a table from a database. The data object includes information regarding an order that is placed over a network publication system. The data object is stored in the column of the table in the database. A request to access the data object is received from a device of a first user. The data object is transmitted to the device of the first user. The data is kept coherent during concurrent updates by using optimistic locks. The data is kept backward and forward compatible utilizing intermediate data structures common to both versions of the software. The data is kept searchable by using lookup indexes. The storage system is kept scalable by sharding data across many databases.

20 Claims, 10 Drawing Sheets

(56) References Cited

U.S. PATENT DOCUMENTS

2016/0275201 A1    9/2016   Li et al.
2017/0147660 A1    5/2017   Rajasekar et al.

OTHER PUBLICATIONS

First Action Interview—Pre-Interview Communication received for U.S. Appl. No. 14/947,998, dated Jun. 5, 2018, 5 pages.
First Action Interview—OA Summary received for U.S. Appl. No. 14/947,998, dated Nov. 9, 2018, 3 pages.
Non Final Office Action Received for U.S. Appl. No. 14/947,998, dated Apr. 14, 2020, 8 pages.
Notice of Allowance received for U.S. Appl. No. 14/947,998, dated Oct. 5, 2020, 8 pages.
VLOB,"Oracle FAQs.", http://www.orafaq.com/wiki/BLOB., Dec. 6, 2008, 1 page.

* cited by examiner

CONSISTENT SCHEMA-LESS SCALABLE STORAGE SYSTEM FOR ORDERS

CROSS REFERENCES

This application is a continuation of U.S. patent application Ser. No. 14/947,998 by Rajasekar et al., entitled "Consistent Schema-Less Scalable Storage System for Orders," filed Nov. 20, 2015, which is hereby incorporated by reference in its entirety.

TECHNICAL FIELD

Embodiments of the present disclosure relate generally to databases and data storage and, more particularly, but not by way of limitation, to a consistent schema-less scalable storage system for orders.

BACKGROUND

Conventionally, a relational database storage system stores data in a database that has a pre-defined structure for the data.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In various embodiments, a network based database storage system is used to manage orders and store them as data objects within a database. Further, the data objects themselves do not have a pre-defined structure. In other words, a data object is not defined using pre-defined attributes or schema. Moreover, the data objects are stored in either a single column or row of a table within a database. Further, although the data objects are stored at the single column or row of the table within the database, access to each of the data objects is shared across all users of the network based system. This allows for varied representation of data while still maintaining ease of access to the data objects pertaining to the orders. Moreover, the database storage system uses optimistic locks which allow for multiple users to read a data object from the database. Using optimistic locks, a first user among the multiple users to write the data object back into the database acquires a lock and prevents any remaining users from writing the data object into the database. Further, the network based database storage system is to generate an intermediate data structure that allows for multiple versions of a software application to handle the data objects. Additionally, the database storage system utilizes lookup tables to assist with the search for the data objects that are stored in the database.

Figure 1:
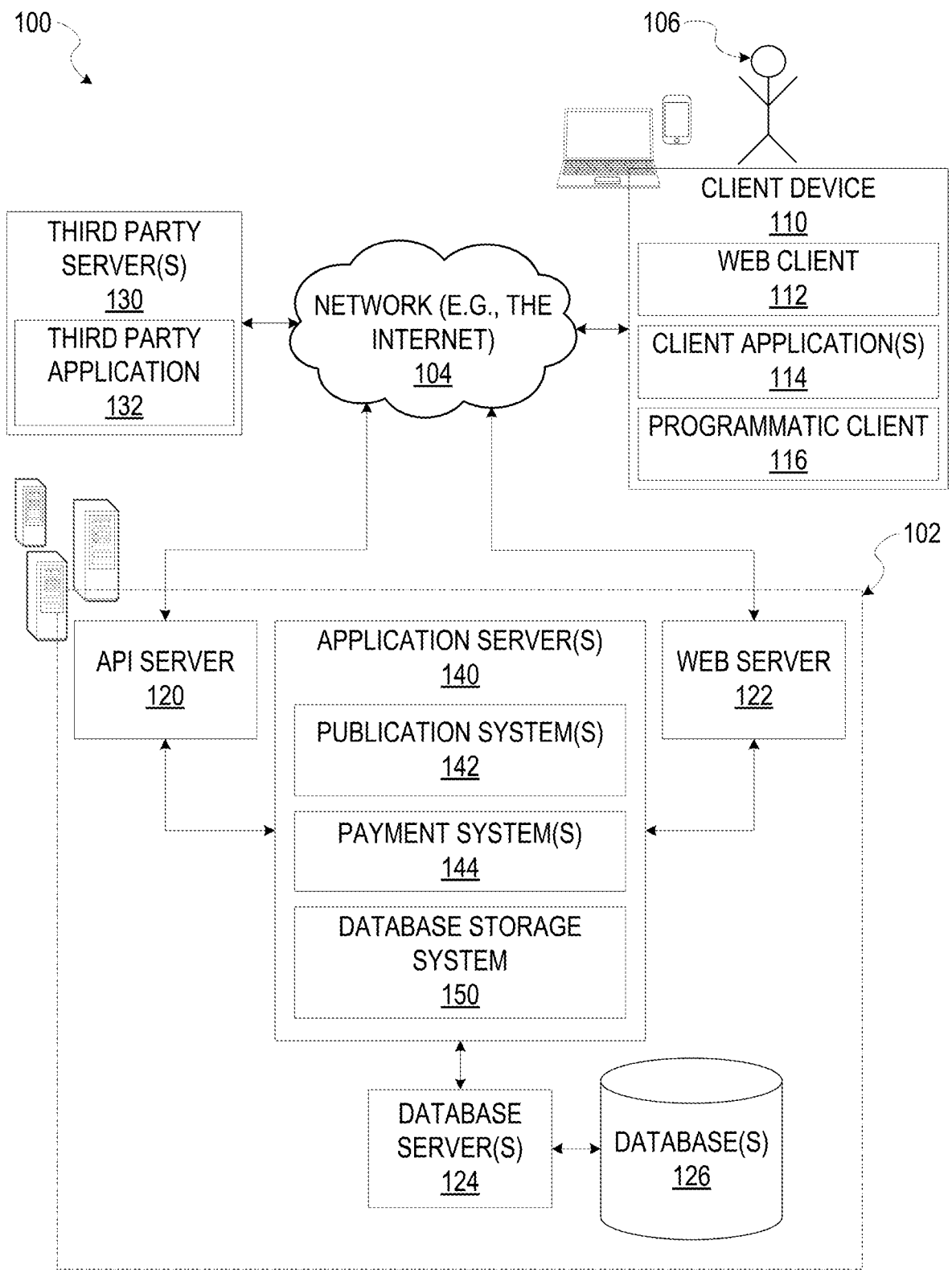
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these marketplace transactions. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The database storage system 150 provides functionality operable to perform various operations with requested data. For example, the database storage system 150 may access the requested data from the databases 126. The database storage system 150 also sends the requested data to the either the third party servers 130, the publication system 142, or other recipients. In some example embodiments, the database storage system 150 manages requests from the client device 110, the third party servers 130, or the application servers 140 to access the user selected data. In some example embodiments, the database storage system 150 communicates with the publication systems 142 (e.g., accessing item listings) and payment system 144. In an alternative embodiment, the database storage system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and database storage system 150 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
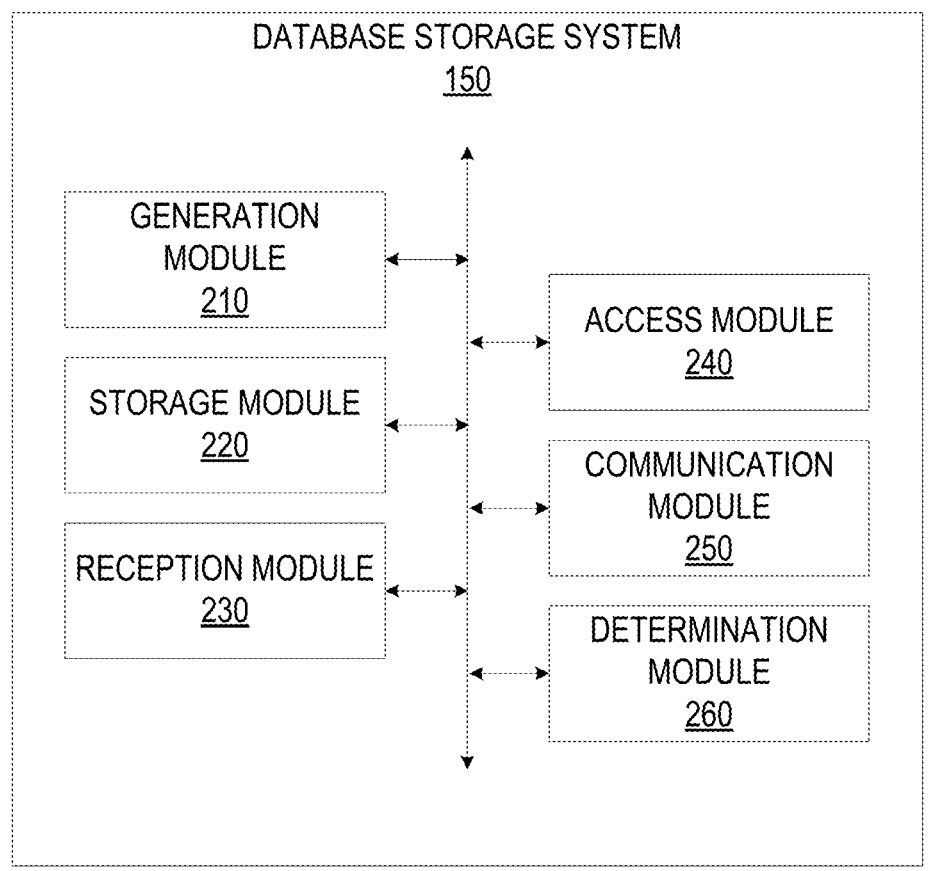
FIG. 2 is a block diagram illustrating components of the database storage system, according to some example embodiments.

FIG. 2 is a block diagram illustrating components of the database storage system 150, according to some example embodiments. The database storage system 150 is shown as including a generation module 210, a storage module 220, a reception module 230, an access module 240, a communication module 250, and a determination module 260 all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various embodiments, the generation module 210 is configured to generate a data object that corresponds to a column of a table from a database. The generated data object may include information regarding an order that is placed over the network publication system. Moreover, the generated data object has a structure that is different from a pre-defined structure. In other words, the generated data object has a structure that does not necessarily conform to the pre-defined structure. In various embodiments, the pre-defined structure indicates pre-defined attributes being used to describe an order that is placed over the network publication system. For example, the pre-defined structure may include a lineItem attribute, and a Payments attribute. The lineItem attribute may include information regarding an item. Further, the Payments attribute may include payment information being used to purchase an item.

In further embodiments, the generated data object includes an attribute that is different from one of the pre-defined attributes. For example, the generated data object may include a deliveryMethod attribute that has information regarding a delivery method of an item. The generated data object may also include the lineItem attribute and the Payments attributes. However, because the generated data object includes the deliveryMethod attribute, the structure of the generated data is different from the pre-defined structure.

In further embodiments, the table stores data objects that have the pre-defined structure and the table corresponds to the pre-defined structure. More specifically, each column of the table stores information from the data objects for one of the pre-defined attributes indicated by the pre-defined structure. As a result, the table includes a number of columns equal to a number of pre-defined attributes. In further embodiments, data objects that have the pre-defined structure are stored in tabular form across the columns of the table. For example, the table may include a first column that stores information from the data objects for the lineItem attribute. Also, the table may include a second column that stores information from the data objects for the Payments attribute. However, because the generated data object is defined using a structure different from the pre-defined structure, the generated data object is stored to a single column or row of a table within the database. In other words, the generated data object is schema-less and has a structure that does not correspond to the columns of the table within the database. Further, the generated data object is stored as a Binary Large Object (BLOB) in the database.

In further embodiments, there are a plurality of pre-defined structures being used to define objects in the database, and each of the pre-defined structures corresponds to a different table in the database. More specifically, the database includes multiple tables that correspond to the plurality of pre-defined structures. However, because the generated data object is defined using a structure that is different from the pre-defined structures, the generated data object can be stored to a single column or row of any of the multiple tables in the database.

In further embodiments, a structure of a database object includes a number of attributes being used to describe the database object. For example, a first data object may be defined using three different attributes, whereas a second data object may be defined using six different attributes. The first data object and the second data object would therefore have different structures. Also, the pre-defined structure may include a number of attributes that is equal to a number of columns of a table from the database.

In further embodiments, the generation module 210 is further to transform information regarding the order that is placed over the network publication system into the generated data object. Moreover, the order is received by the reception module 230 and the reception module 230 is configured to receive the order. In some embodiments, the generated data object is expressed in a particular language format, such as JavaScript Object Notation (JSON).

For example, an example generated data object may comprise a LineItem attribute, a FulfillmentPlan attribute, a Payments attribute, a Distributions attribute, a FulfillmentLeg attribute, and a Package attribute. Information for each of the attributes is stored as part of the generated data object in the column of the table from the database. Moreover, the generated data object may include information regarding each of the attributes. For example, the generated data object will include a description or a string of characters for the LineItem attribute. As another example, the generated data object will include a numerical value for the Package attribute. Moreover, the data object is expressed or serialized to JSON and stored in the database. Additionally, a further data object generated by the generation module 210 may include attributes that are different from the ones listed above. In other words, the further data object is generated to include the attributes that are different from the ones listed above. Also, the further data object is stored in the column of the table from the database.

In various embodiments, the storage module 220 is configured to store the generated data object in the column of the table from the database. The column of the table may also include a further data object that was previously stored in the database by the storage module 220. Also, the further data object may be defined using a structure that is different from the structure of the generated data object. In further embodiments, the storage module 220 is configured to determine that the generated data object corresponds to the column of the table from the database based on an attribute included in the generated data object. For example, the generated data object may include an identification number that is used to determine that the generated data object is to be stored in the column of the table from the database.

In some cases, there may be more than one database where a data object can be stored. Therefore, the identification number is used by the storage module 220 to determine where the generated data object is to be stored. In other words, the identification number is used by the storage module 220 to determine a database where the generated data object is to be stored. This allows for the system to store the orders across more than one database, and thereby allowing for scalability of the orders. More specifically, in various example embodiments, the database is assigned a sequence of identification numbers. The storage module 220 is further to identify that the database has the identification number of the data object within its sequence of identification numbers. In some instances, a value of the identification number is sequential with respect to other data objects. In some instances, the value of the identification number bears no linear or sequential relationship with respect to the other data objects.

In various embodiments, the reception module 230 is configured to receive a request, from a client device, to access the generated data object stored in the column of the table from the database. For example, a user operating the client device will request to access the generated data object in order to modify its contents, as further explained below.

In various embodiments, the access module 240 is configured to access data objects stored in the column of the table from the database (e.g., the generated data object or the further data object). In further embodiments, the access module 240 is to access a lookup table that indicates one or more attributes of the data objects (e.g., the generated data object or the further data object). Moreover, the access module 240 is further to access the data objects based on the one or more attributes of the data objects. The lookup tables are provided in order to assist with the retrieval of the data objects from the database, because the data objects are stored within a single column or row of data from the database.

In various embodiments, the communication module 250 is configured to transmit the generated data object to the client device (e.g., a device belonging to a user). Once the generated object is transmitted to the client device, the client device is able to modify or edit the data object to alter the contents of the data object. In other words, the client device is able to create a modification of the transmitted data object.

In further embodiments, the reception module 230 is to receive modifications of the transmitted data objects (e.g., the generated data object or the further data object) from the client device. For instance, the reception module 230 is configured to receive a modification of the data object from the client device. Once received at the reception module 230, the storage module 220 is further configured to store the modification of the data object to the column of the table from the database. A modification of the data object may include a change to one or more of the attributes included in the data object. For instance, a value of an attribute may be edited or changed, thereby modifying the data object.

In various embodiments, the determination module 260 is configured to determine that a further modification of the transmitted data object is stale based on the storing of the modification of the data object to the column of the table. The further modification of the data object may be stale because another version of the transmitted data object (e.g., the modification of the data object) has already been stored in the database.

For example, the reception module 230 may receive a first modification of the data object and a second modification of the data object. Moreover, the storage module 220 may store the first modification of the data object to the database. Further, the determination module 260 determines that the second modification of the data object is stale because the first modification of the data object has already been stored in the database.

Under this scheme, the database allows for more than one client device to access the data object from the database. Accordingly, the data object is transmitted to the more than one client device in order for multiple users to modify or edit the data object. Therefore, the system allows for open reads of the data object from the database in that the multiple users may read the data object from the database. However, once a modification of the transmitted data object is stored back into the database, all subsequent modifications of the data object become stale. In further embodiments, the determination module 260 is further to determine that a check-in of the data object has been performed. The check-in of the data object may be used to indicate that a modification of the transmitted data object has been stored to the column of the table from the database. More specifically, once the storage module 220 stores the modification of the data object in the database, a check-in occurs. In further embodiments, the check-in of the data object is equivalent to obtaining a lock on the transmitted data object, and the lock prevents others from storing their modifications to the transmitted data object.

In further embodiments, the generation module 210 is to generate an intermediate data structure for the data object. This is due to the fact that the data object may include one or more attributes that are incompatible with an older version of a software application (e.g., a first version of a software application). In contrast, the intermediate data structure is readable by both a first version of a software application and a second version of the software application. In other words, the intermediate data structure includes attributes that are compatible with both the first version of the software application and the second version of the software application. Moreover, the intermediate data structure is generated by the generation module 210 using the attributes included in the data object. In other words, the intermediate data structure may include attributes from the data object that are compatible with both the first version of the software application and the second version of the software application.

Further, the software application may be an application that is running on a server (e.g., database server 124) that is used to access the data object from the database. Also, the software application is used to store the data object to the database. The intermediate data structure facilitates backward and forward compatibility of the data object with respect to the software application, thereby enabling multiple versions of the software application to access the data object from the database and store the data object to the database.

In further embodiments, the intermediate data structure is utilized during serialization of the data object. In other words, the data object is expressed in JSON format using the intermediate data structure. Accordingly, the storage module 220 is further to store the data object based on the intermediate data structure.

In various embodiments, the determination module 260 is further to discard the further modification of the data object. In other words, the further modification of the data object is not stored to the database by the storage module 220.

Figure 3:
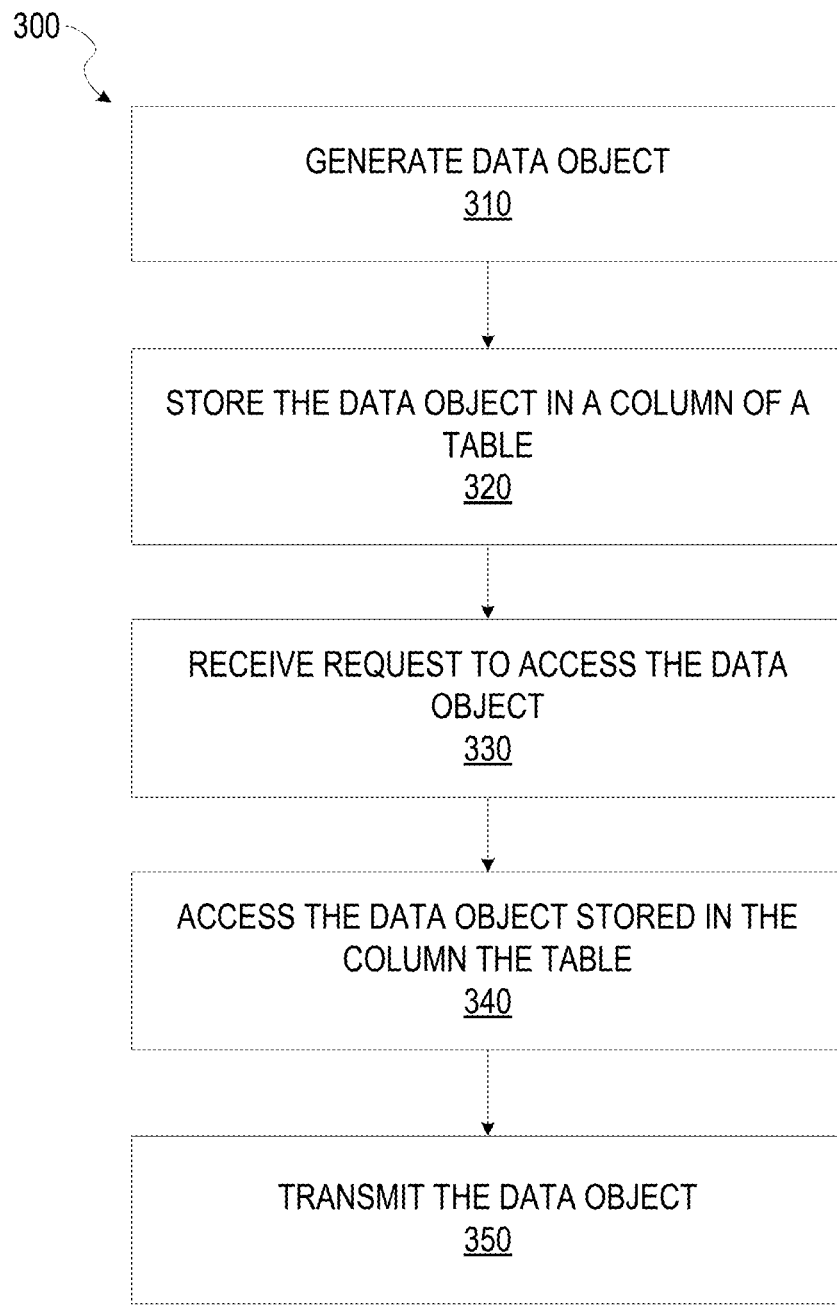
FIG. 3-5 are flowcharts illustrating operations of the database storage system in performing a method of transmitting a data object, according to some example embodiments.
Figure 4:
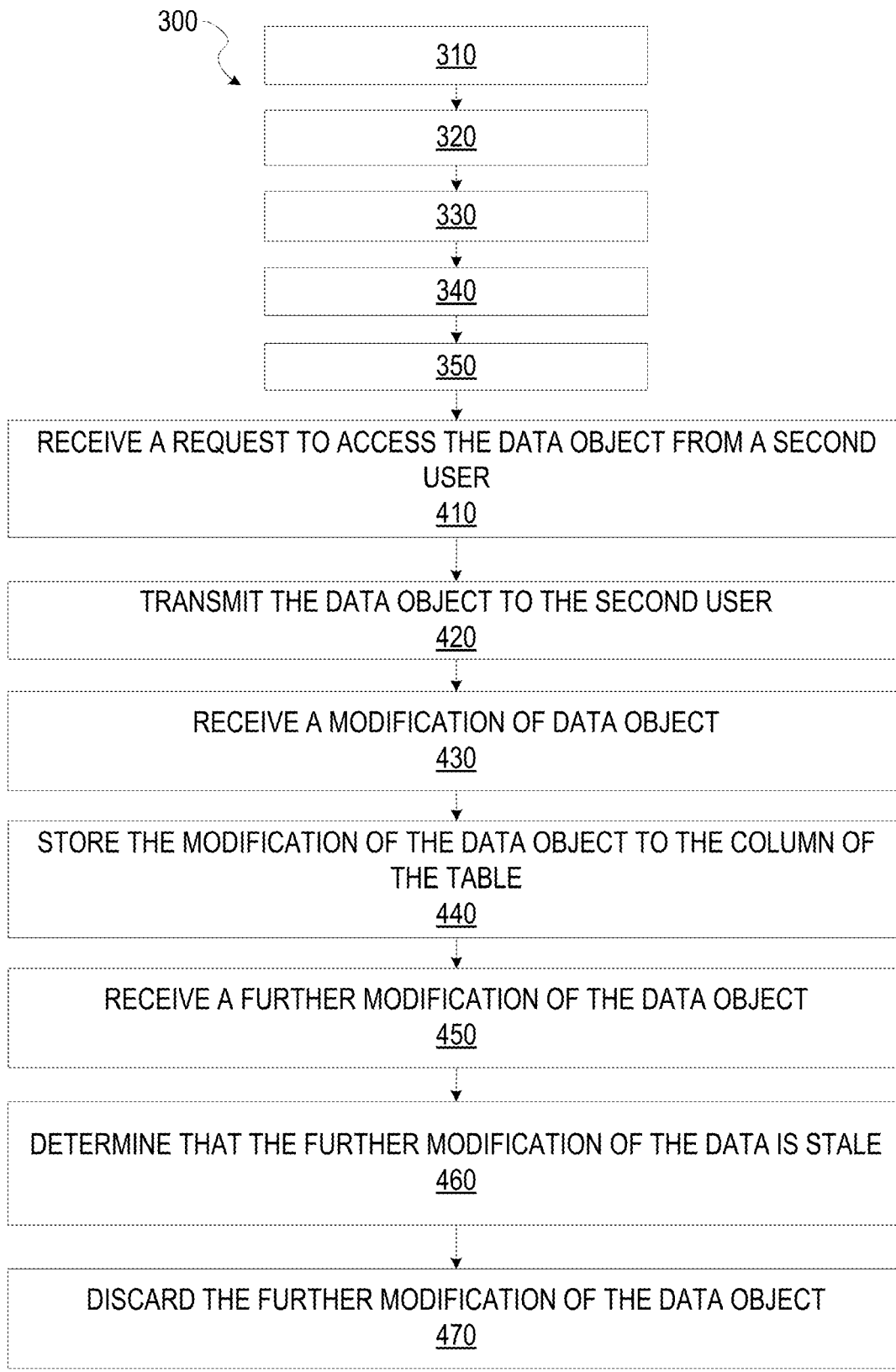
Figure 5:
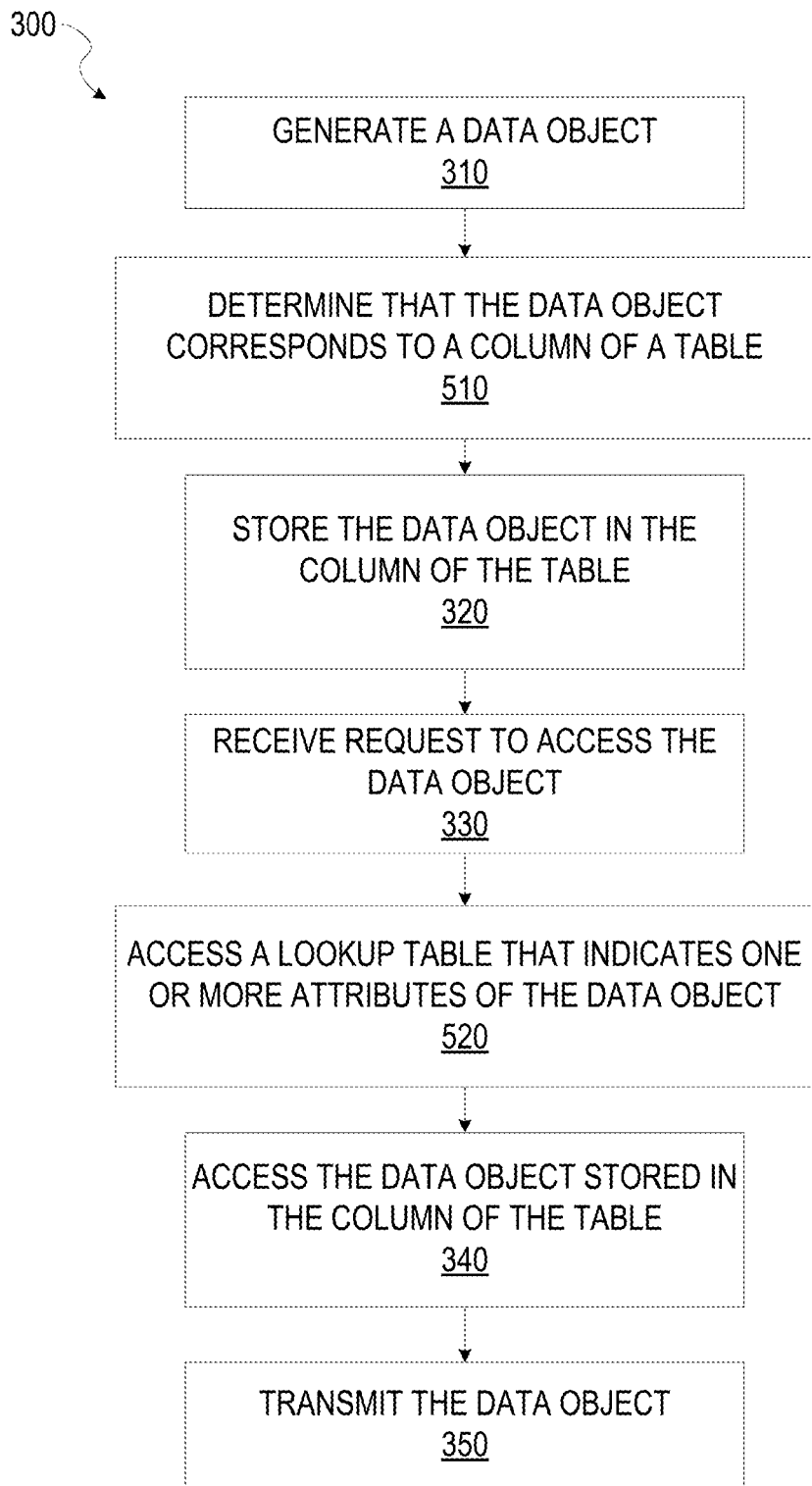

FIG. 3-5 are flowcharts illustrating operations of the database storage system 150 in performing a method 300 of transmitting a data object, according to some example embodiments. Operations in the method 300 may be performed by the database storage system 150, using modules described above with respect to FIG. 2. As shown in FIG. 3, the method 300 includes operations 310, 320, 330, 340, and 350.

At operation 310, the generation module 210 generates a data object. The data object may correspond to a column of a table from a database.

At operation 320, the storage module 220 stores the data object in the column of the table from a database. The column of the table may include a further data object that was previously stored in the database by the storage module 220. Moreover, the further data object may have a structure that is different from a structure of the data object.

At operation 330, the reception module 230 receives a request to access the data object. The request may be received from a client device operated by a first user.

At operation 340, the access module 240 accesses the data object stored in the column of the table from the database.

At operation 350, the communication module 250 transmits the data object to the client device operated by the first user. Once the data object is transmitted to the client device, the client device is able to modify or edit the data object to alter the contents of the data object.

As shown in FIG. 4, the method 300 may include one or more of operations 410, 420, 430, 440, 450, 460, and 470. Moreover, the operations described in FIG. 4 may be used to allow multiple users to access the data object.

At operation 410, the reception module 230 receives a request to access the data object from a second user. The request is received from a client device operated by the second user.

At operation 420, the communication module 250 transmits the data object to the client device operated by the second user. Once the object is transmitted to the client device, the client device is able to modify or edit the data object to alter the contents of the data object.

At operation 430, the reception module 230 receives a modification of the data object. Moreover, the modification of the data object is received from the client device operated by the first user. A modification of the data object may include a change to one or more of the attributes included in the data object. For instance, a value of an attribute may be edited or changed, thereby modifying the data object.

At operation 440, the storage module 220 stores the modification of the data object to the column of the table from the database.

At operation 450, the reception module 230 receives a further modification of the data object. The further modification of the data object is received from the client device operated by the second user.

At operation 460, the determination module 260 determines that the further modification of the data object is stale. The determination may be based on the storing of the modification of the data object to the column of the table as performed at operation 440. The further modification of the data object may be stale because another modification of the data object has already been stored in the database.

At operation 470, the determination module 260 discards the further modification of the data object.

As shown in FIG. 5, the method 300 may include one or more of operations 510 and 520.

At operation 510, the storage module 220 determines that the data object corresponds to a column of a table from a database based on an attribute of the data object. For example, the data object may include an identification number that is used to determine that the data object is to be stored in the column of the table from the database. The identification number may also be used to determine which database to store the data object.

At operation 520, the access module 240 accesses a lookup table that indicates one or more attributes of the data object. In some instances, the lookup table indicates a data type of an attribute of the data object. In some instances, the lookup table indicates a name of an attribute of the data object. Moreover, the access module 240 uses the name of the attribute of the data object to retrieve the attribute of the data object from the column of the database. Alternatively, the access module 240 uses the data type of the attribute of the data object to access the attribute of the data object from the column of the database.

Figure 6:
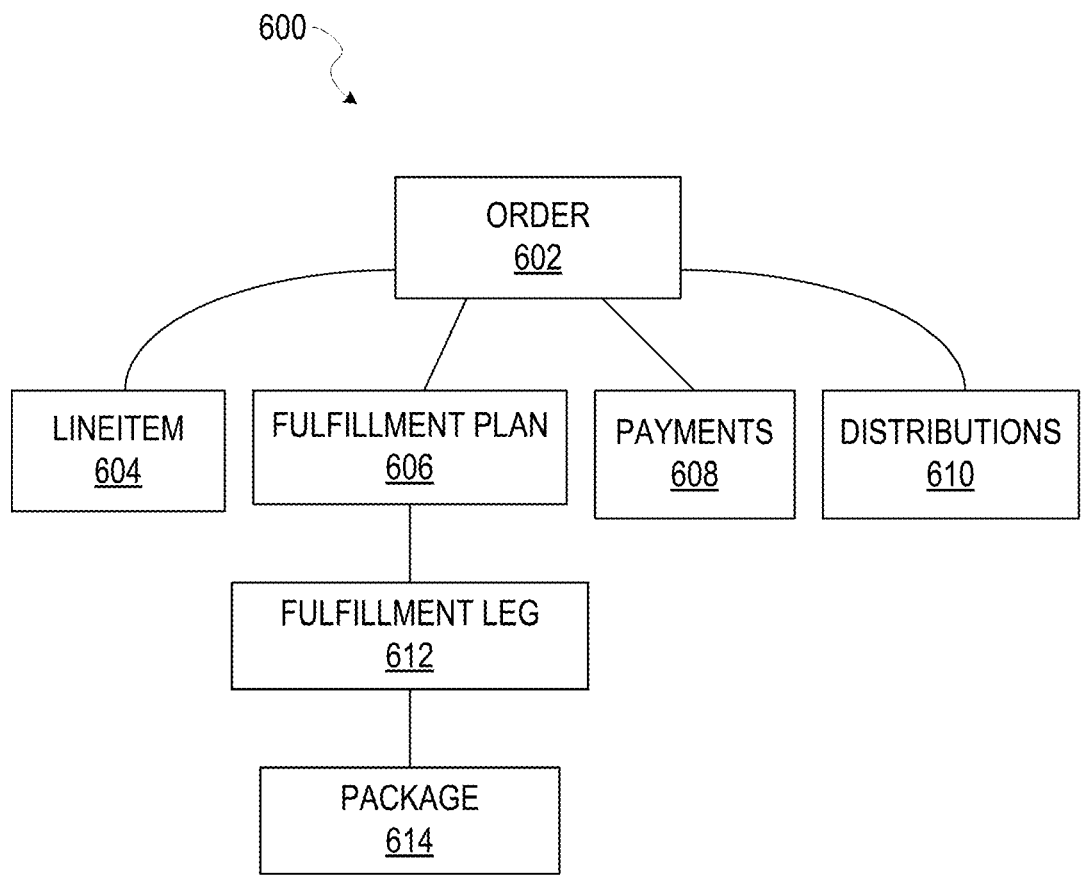
FIG. 6 is a block diagram illustrating an example data object, according to some example embodiments.

FIG. 6 is a block diagram illustrating an example data object 600, according to some example embodiments. As shown, the example data object 600 includes a set of attributes. The attributes include: Order 602, LineItem 604, Fulfillment Plan 606, Payments 608, Distributions 610, Fulfillment Leg 612, and Package 614. The data object 600 may correspond to an order that is placed over the network publication system. Further, each of the attributes 602, 604, 606, 608, 610, 612, and 614 includes information about the order placed over the network publication system. For example, the order 602 attribute may include information that identifies an order that was placed with the network publication system. The payments 608 attribute may include payment information for the order.

Figure 7:
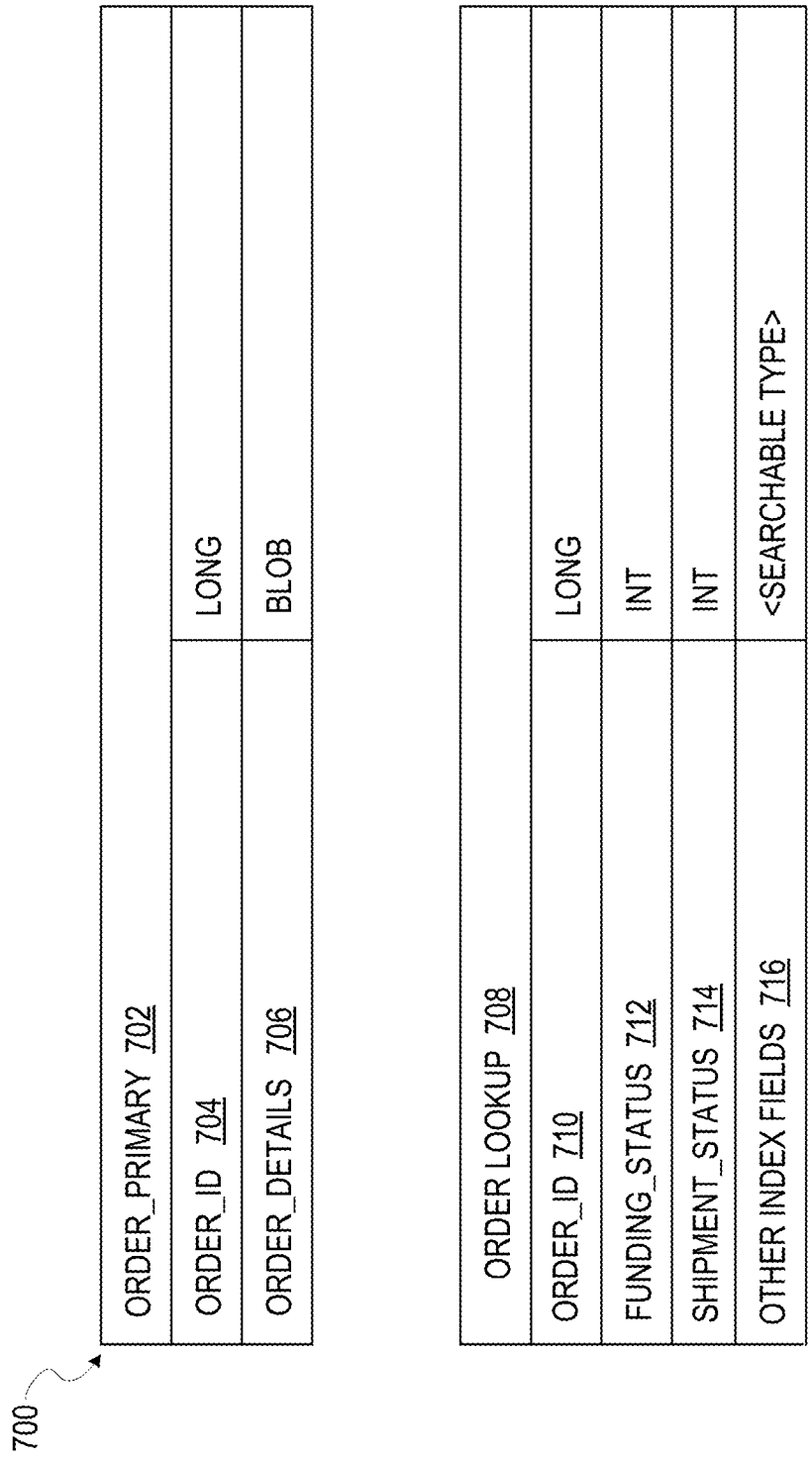
FIG. 7 is a block diagram illustrating example lookup tables, according to some example embodiments.

FIG. 7 is a block diagram illustrating example lookup tables 700, according to some example embodiments. A first lookup table 702 and a second lookup table 708 are shown as part of FIG. 7. The first lookup table 702 and the second lookup table 708 both include fields that are used by the storage module 220 to retrieve or access the data objects from the column of the table from the database. As shown in FIG. 7, the fields include an order_id field 704, an order_details field 706, an second order_id field 710, a funding_status field 712, a shipment_status field 714, and other index fields 716. Each field may indicate a data type of an attribute of the data objects. More specifically, the data type specifies a type of value associated with the attribute (e.g., integer, string, Boolean, and the like). Each field may also indicate a name of an attribute of the data objects. In other words, each of the fields corresponds to a respective attribute of the data objects. The access module 240 may use the name of the attribute to access that particular attribute from data objects stored in the column of the table from the database.

Figure 8:
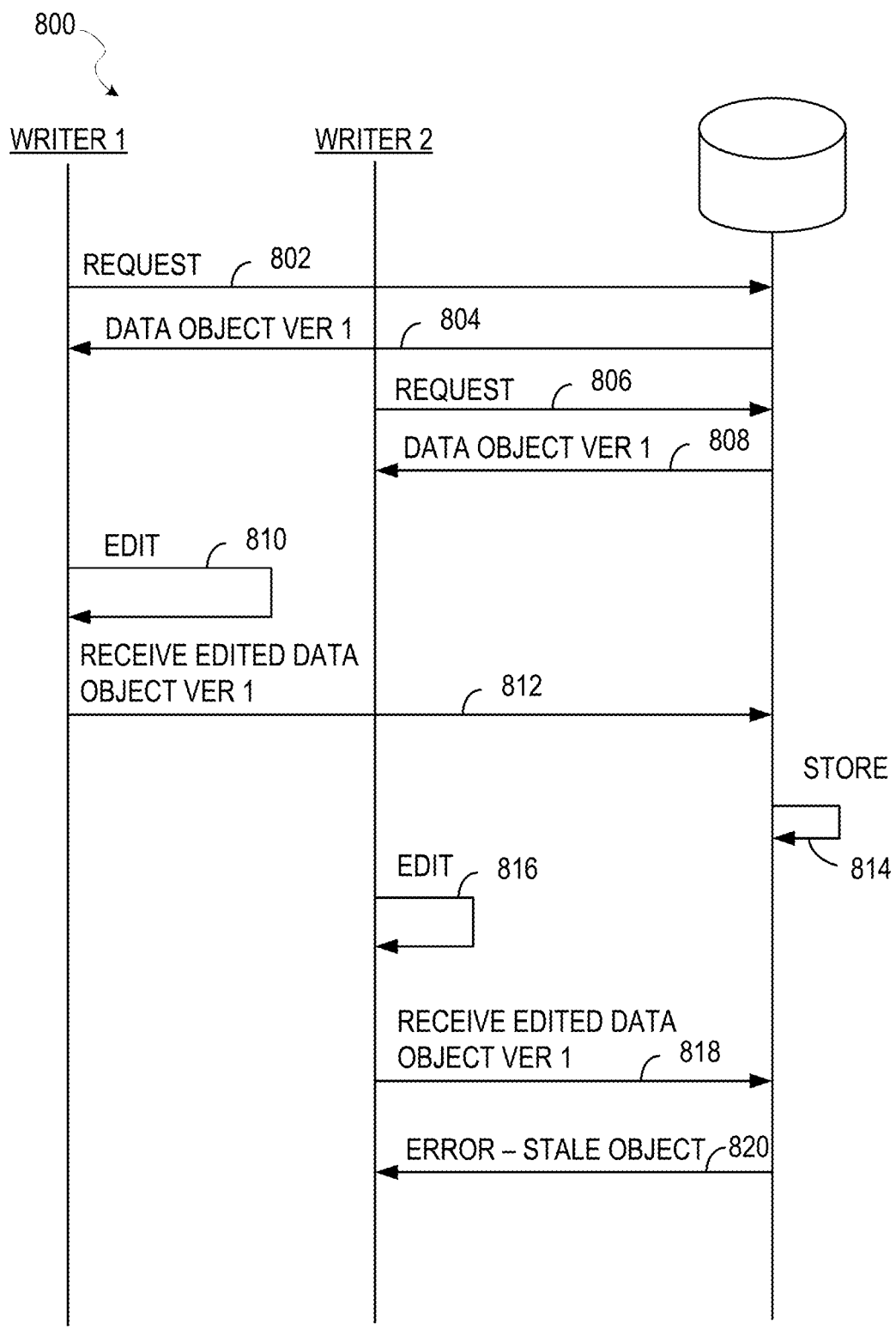
FIG. 8 is a block diagram illustrating management of modifications to a data object, according to some example embodiments.

FIG. 8 is a block diagram illustrating management of modifications to a data object, according to some example embodiments. In other words, the management of modifications is performed using locks. Moreover, the operations shown in the block diagram 800 may be performed by the database storage system 150. At operation 802, a request to access a data object from a database is received from a first user. At operation 804, the data object is transmitted to a client device operated by the first user. At operation 806, a request to access the data object is also received from a second user. At operation 808, the data object is transmitted to a client device operated by the second user. At operation 810, the first user edits the data object and creates a modification of the data object. At operation 812, the modification of the data object is received. At operation 814, the modification of the data object is stored. At operation 816, the second user edits the data object and creates a further modification of the data object. At operation 818, the further modification of the data object is received. However, because the further modification is stale, at operation 820, an error message is transmitted to the client device operated by the second user.

Figure 9:
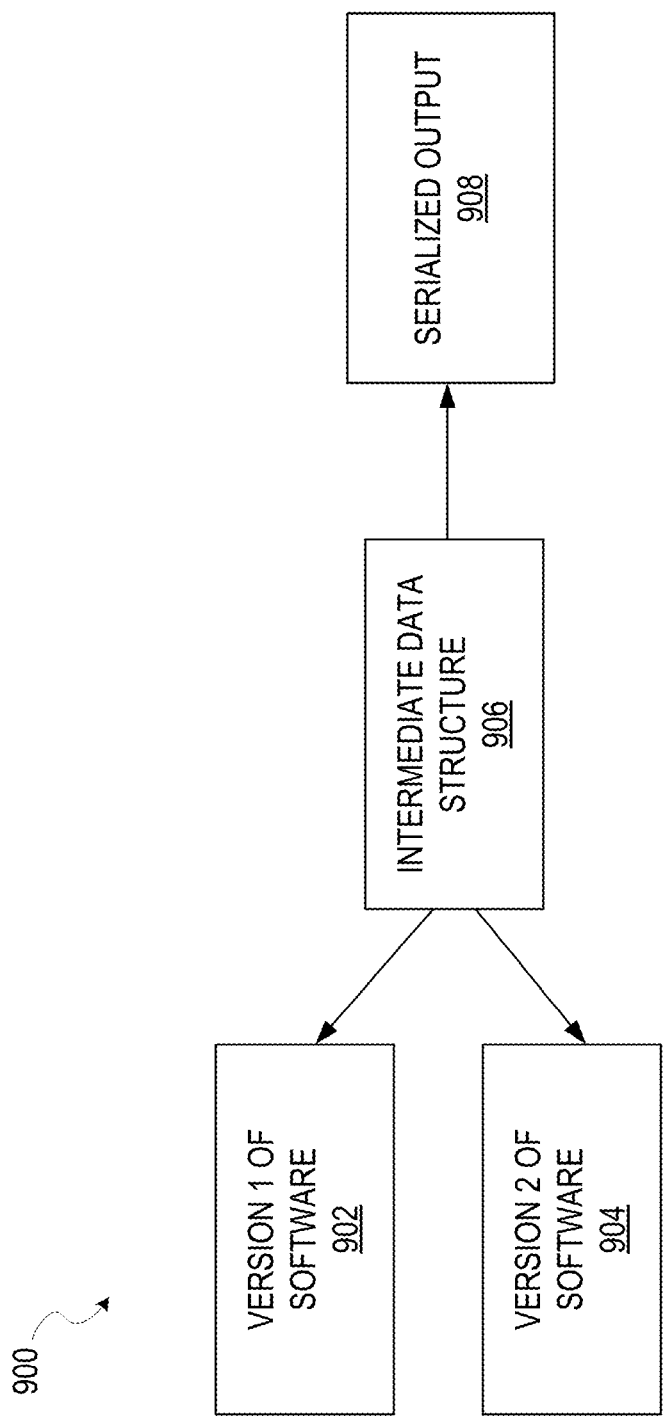
FIG. 9 is a block diagram illustrating a relationship between an intermediate data structure and two different versions of a software application, according to some example embodiments.

FIG. 9 is a block diagram 900 illustrating a relationship between an intermediate data structure and two different versions of a software application, according to some example embodiments. As shown in FIG. 9, the block diagram 900 includes a first version of a software application 902, a second version of a software application 904, an intermediate data structure 906, and a serialized output 908. As stated previously, the intermediate data structure facilitates backward and forward compatibility of a data object with respect to the software application, which is shown in FIG. 9 as having two versions (e.g., the first version of the software application 902 and the second version of the software application 904). The intermediate data structure enables multiple versions of the software application to access the data object from the database and store the data object to the database. In other words, the intermediate data structure 906 is used to generate the serialized output 908 that is readable by both versions of the software application.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
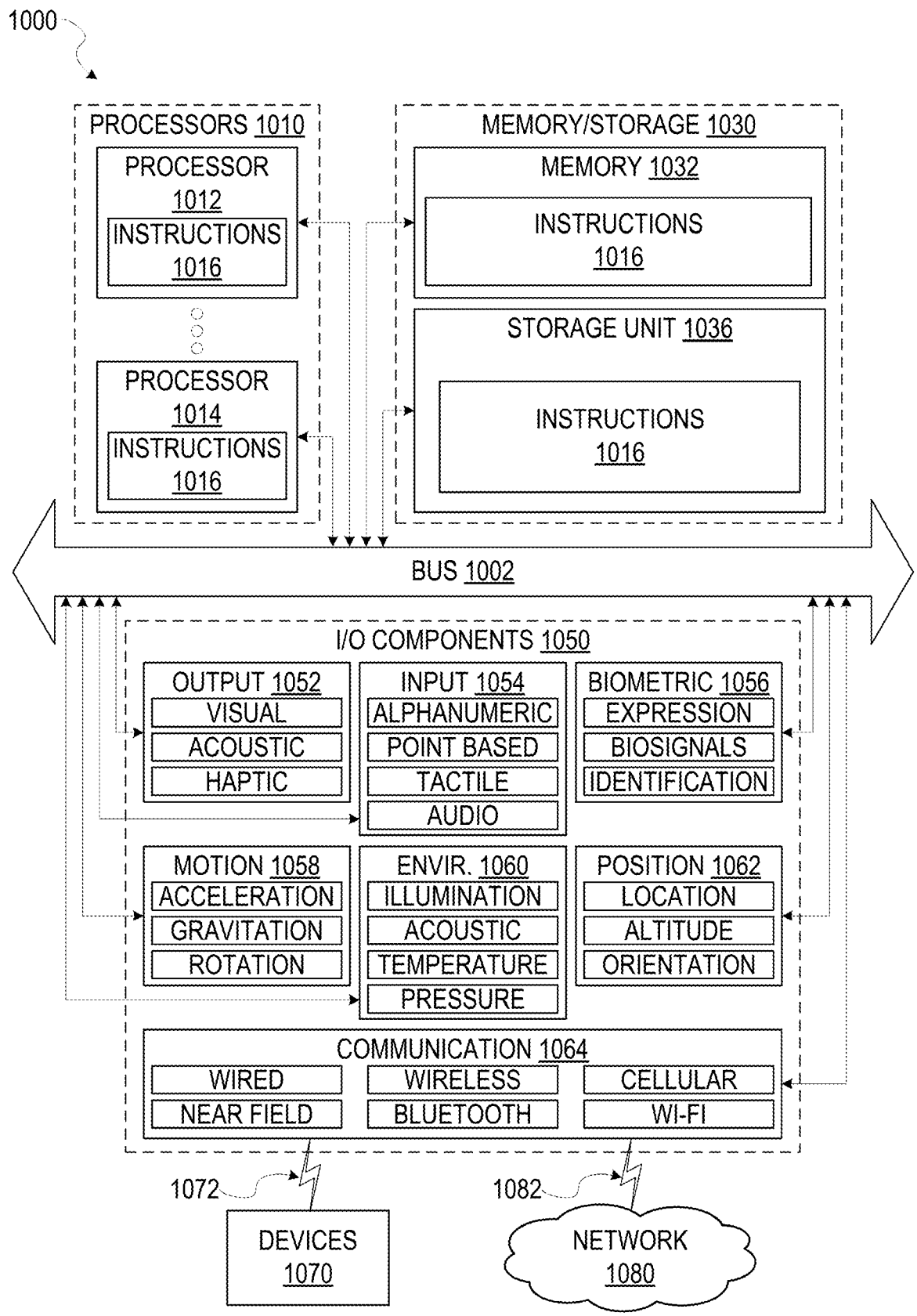
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-5. Additionally, or alternatively, the instructions may implement the modules of FIG. 2, and so forth. The instructions transform the general, non-programmed machine into a particular machine specially configured to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method of an application server, the method comprising:
storing, by at least one processor of the application server, a first data object in a database accessible by the application server, the first data object associated with an order on an online marketplace, the first data object including at least one order attribute that is compatible with a first version of a software application and incompatible with a second version of the software application;
storing, by the at least one processor of the application server, a second data object in the database, the second data object associated with the order on the online marketplace, the second data object including a plurality of order attributes that are compatible with the first version and the second version of the software application;
receiving, from a first client device, a first request to access data associated with the order of the online marketplace;
accessing, from the database by the at least one processor of the application server, one of the first data object or the second data object in response to the first request, wherein the accessing comprises:
accessing the first data object from the database using the first version of the software application based at least in part on the first request corresponding to the at least one order attribute that is incompatible with the second version of the software application; or
accessing the second data object from the database using either of the first version or the second version of the software application based at least in part on the first request corresponding to the plurality of order attributes; and
transmitting, by the at least one processor of the application server to the first client device, one of the first data object or the second data object based at least in part on accessing one of the first data object or the second data object from the database.

2. The computer-implemented method of claim 1, further comprising:
receiving the order on the online marketplace from a second client device, the order comprising the at least one order attribute; and
generating the first data object based at least in part on the at least one order attribute being incompatible with the second version of the software application.

3. The computer-implemented method of claim 1, further comprising:
receiving, from the first client device, a first message indicating a first modification to one of the first data object or the second data object; and
storing the first modification to the first data object or the second data object in the database.

4. The computer-implemented method of claim 3, further comprising:

receiving, from a second client device, a second request to access data associated with the order on the online marketplace;
transmitting, to the second client device in response to the second request, one of the first data object or the second data object;
receiving, from the second client device, a second message indicating a second modification to one of the first data object or the second data object; and
transmitting a third message to the second client device indicating that the second modification will not be stored in the database based at least in part on the second message.

5. The computer-implemented method of claim 4, further comprising:
refraining from storing the second modification in the database based at least in part on storing the first modification.

6. The computer-implemented method of claim 1, wherein the first data object is associated with a first identification number, and wherein the second data object is associated with a second identification number which is different from the first identification number.

7. The computer-implemented method of claim 1, further comprising:
causing presentation of one or more order attributes of the plurality of order attributes via a user interface of the first client device based at least in part on transmitting one of the first data object or the second data object.

8. An apparatus comprising:
a processor; and
a memory to store instructions that, when executed by the processor, cause the apparatus to perform operations comprising:
storing a first data object in a database accessible by the apparatus, the first data object associated with an order on an online marketplace, the first data object including at least one order attribute that is compatible with a first version of a software application and incompatible with a second version of the software application;
storing a second data object in the database, the second data object associated with the order on the online marketplace, the second data object including a plurality of order attributes that are compatible with the first version and the second version of the software application;
receiving, from a first client device, a first request to access data associated with the order of the online marketplace;
accessing one of the first data object or the second data object from the database in response to the first request, wherein the accessing comprises:
accessing the first data object from the database using the first version of the software application based at least in part on the first request corresponding to the at least one order attribute that is incompatible with the second version of the software application; or
accessing the second data object from the database using either of the first version or the second version of the software application based at least in part on the first request corresponding to the plurality of order attributes; and
transmitting one of the first data object or the second data object to the first client device based at least in part on accessing one of the first data object or the second data object from the database.

9. The apparatus of claim 8, the operations further comprising:
receiving the order on the online marketplace from a second client device, the order comprising the at least one order attribute; and
generating the first data object based at least in part on the at least one order attribute being incompatible with the second version of the software application.

10. The apparatus of claim 8, the operations further comprising:
receiving, from the first client device, a first message indicating a first modification to one of the first data object or the second data object; and
storing the first modification to the first data object or the second data object in the database.

11. The apparatus of claim 10, the operations further comprising:
receiving, from a second client device, a second request to access data associated with the order on the online marketplace;
transmitting, to the second client device in response to the second request, one of the first data object or the second data object;
receiving, from the second client device, a second message indicating a second modification to one of the first data object or the second data object; and
transmitting a third message to the second client device indicating that the second modification will not be stored in the database based at least in part on the second message.

12. The apparatus of claim 11, the operations further comprising:
refraining from storing the second modification in the database based at least in part on storing the first modification.

13. The apparatus of claim 8, wherein the first data object is associated with a first identification number, and wherein the second data object is associated with a second identification number which is different from the first identification number.

14. The apparatus of claim 8, the operations further comprising:
causing presentation of one or more order attributes of the plurality of order attributes via a user interface of the first client device based at least in part on transmitting one of the first data object or the second data object.

15. A non-transitory computer-readable medium of an application server storing instructions that, when executed by a processor, cause the processor to perform operations comprising:
storing a first data object in a database accessible by the application server, the first data object associated with an order on an online marketplace, the first data object including at least one order attribute that is compatible with a first version of a software application and incompatible with a second version of the software application;
storing a second data object in the database, the second data object associated with the order on the online marketplace, the second data object including a plurality of order attributes that are compatible with the first version and the second version of the software application;
receiving, from a first client device, a first request to access data associated with the order of the online marketplace;
accessing one of the first data object or the second data object from the database in response to the first request, wherein the accessing comprises:
accessing the first data object from the database using the first version of the software application based at least in part on the first request corresponding to the at least one order attribute that is incompatible with the second version of the software application; or
accessing the second data object from the database using either of the first version or the second version of the software application based at least in part on the first request corresponding to the plurality of order attributes; and
transmitting one of the first data object or the second data object to the first client device based at least in part on accessing one of the first data object or the second data object from the database.

16. The non-transitory computer-readable medium of claim 15, the operations further comprising:
receiving the order on the online marketplace from a second client device, the order comprising the at least one order attribute; and
generating the first data object based at least in part on the at least one order attribute being incompatible with the second version of the software application.

17. The non-transitory computer-readable medium of claim 15, the operations further comprising:
receiving, from the first client device, a first message indicating a first modification to one of the first data object or the second data object; and
storing the first modification to the first data object or the second data object in the database.

18. The non-transitory computer-readable medium of claim 17, the operations further comprising:
receiving, from a second client device, a second request to access data associated with the order on the online marketplace;
transmitting, to the second client device in response to the second request, one of the first data object or the second data object;
receiving, from the second client device, a second message indicating a second modification to one of the first data object or the second data object; and
transmitting a third message to the second client device indicating that the second modification will not be stored in the database based at least in part on the second message.

19. The non-transitory computer-readable medium of claim 18, the operations further comprising:
refraining from storing the second modification in the database based at least in part on storing the first modification.

20. The non-transitory computer-readable medium of claim 15, wherein the first data object is associated with a first identification number, and wherein the second data object is associated with a second identification number which is different from the first identification number.

* * * * *